US006346067B1

United States Patent
Walters

(10) Patent No.: US 6,346,067 B1
(45) Date of Patent: Feb. 12, 2002

(54) REMOVABLE FLUTES FOR CROP CONDITIONER CRIMP ROLLS

(75) Inventor: James C. Walters, Delta, CO (US)

(73) Assignee: Deere & Company, Moline, IL (US)

( * ) Notice: Subject to any disclaimer, the term of this patent is extended or adjusted under 35 U.S.C. 154(b) by 245 days.

(21) Appl. No.: 08/953,878

(22) Filed: Oct. 24, 1997

(51) Int. Cl.$^7$ .............................................. A01B 29/00
(52) U.S. Cl. ............................................ 492/36; 492/30
(58) Field of Search .............................. 492/30, 36, 47, 492/48, 45; 56/16.4 B, 16.4 C, 16.4 A; 411/399, 187, 188; 241/294

(56) References Cited

U.S. PATENT DOCUMENTS

| | | | | |
|---|---|---|---|---|
| 669,444 A | * | 3/1901 | Klitsch | 492/36 |
| 803,972 A | * | 11/1905 | Bechman | 492/36 |
| 1,112,926 A | * | 10/1914 | Morse | 492/36 |
| 1,146,282 A | * | 7/1915 | Rogers | 492/36 |
| 1,432,243 A | * | 10/1922 | Harris | 411/399 |
| 1,441,960 A | * | 1/1923 | Yard | 492/36 |
| 1,843,353 A | * | 2/1932 | Wright | 492/36 |
| 1,951,827 A | * | 3/1934 | Frommer | 492/36 |
| 2,009,848 A | * | 7/1935 | Keltie | 492/36 |
| 2,075,448 A | * | 3/1937 | Lundquist et al. | 492/36 |
| 2,811,819 A | | 11/1957 | Heth | |
| 3,982,385 A | * | 9/1976 | Hyman | 56/106 |
| 4,031,600 A | * | 6/1977 | Whigham | 492/48 |
| 4,233,804 A | * | 11/1980 | Fischer et al. | 56/104 |
| 4,797,022 A | * | 1/1989 | Crigger | 411/399 |
| 4,807,339 A | * | 2/1989 | Hayashi | 492/36 |
| 4,854,114 A | * | 8/1989 | Speck | 411/399 |
| 4,914,909 A | * | 4/1990 | Linde et al. | 56/16.4 C |
| 5,146,675 A | * | 9/1992 | Ford et al. | 492/47 |
| 5,383,834 A | * | 1/1995 | Kanome et al. | 492/30 |
| 5,401,231 A | * | 3/1995 | Hebert | 492/37 |
| 5,605,032 A | * | 2/1997 | Gantzer | 56/16.4 B |
| 5,622,464 A | * | 4/1997 | Dill et al. | 411/399 |

FOREIGN PATENT DOCUMENTS

| | | | | |
|---|---|---|---|---|
| AU | 14967 | * | 1/1929 | 492/36 |
| DK | 748313 | * | 11/1944 | 492/36 |
| NO | 40078 | * | 10/1924 | 492/36 |
| GB | 610 | * | 12/1910 | 492/45 |

OTHER PUBLICATIONS

The American Heritage Dictionary of the English Language, Third Edition copyright 1992 by Houghton Mifflin Company.*

* cited by examiner

Primary Examiner—I. Cuda Rosenbaum
Assistant Examiner—T. Nguyen

(57) ABSTRACT

A conditioner roll includes a cylindrical, tubular metal core having four, straight metal flutes, in the form of channel members, extending full length of, and releasably attached to, the core. In one embodiment, each flute is attached by a plurality of bolts extending radially outwardly through and anchored in respective holes provided in the core, the bolts being respectively received in a plurality of holes provided in the flute. A nut is received on a threaded exposed end of each bolt so as to clamp the flute in place. Access holes are provided for permitting installation of the bolts. In a second embodiment, swage nuts are respectively anchored in mounting holes provided in the core for locating each flute, the nuts having been deformed axially, during installation of the flute mounting bolts, to form shoulders located interiorly of the core wall so as to that the nuts stay in place as the bolts are tightened against the flute.

6 Claims, 3 Drawing Sheets

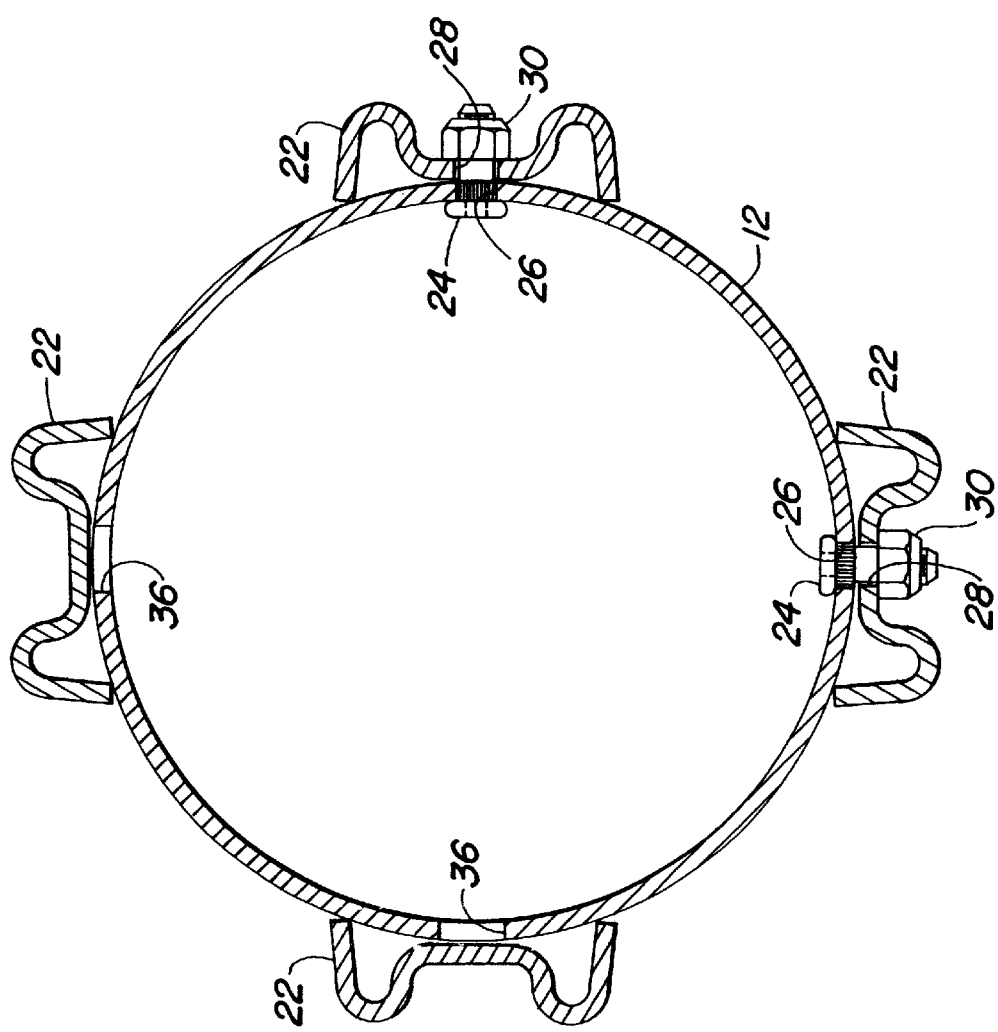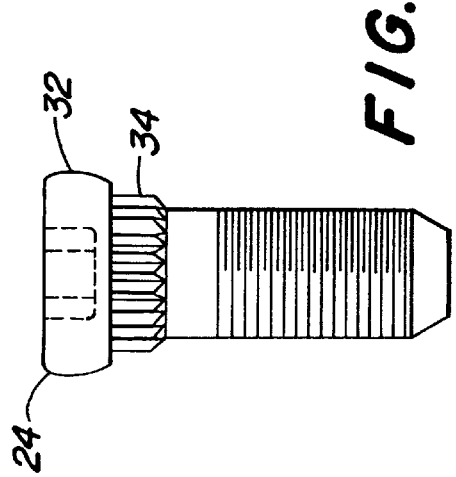

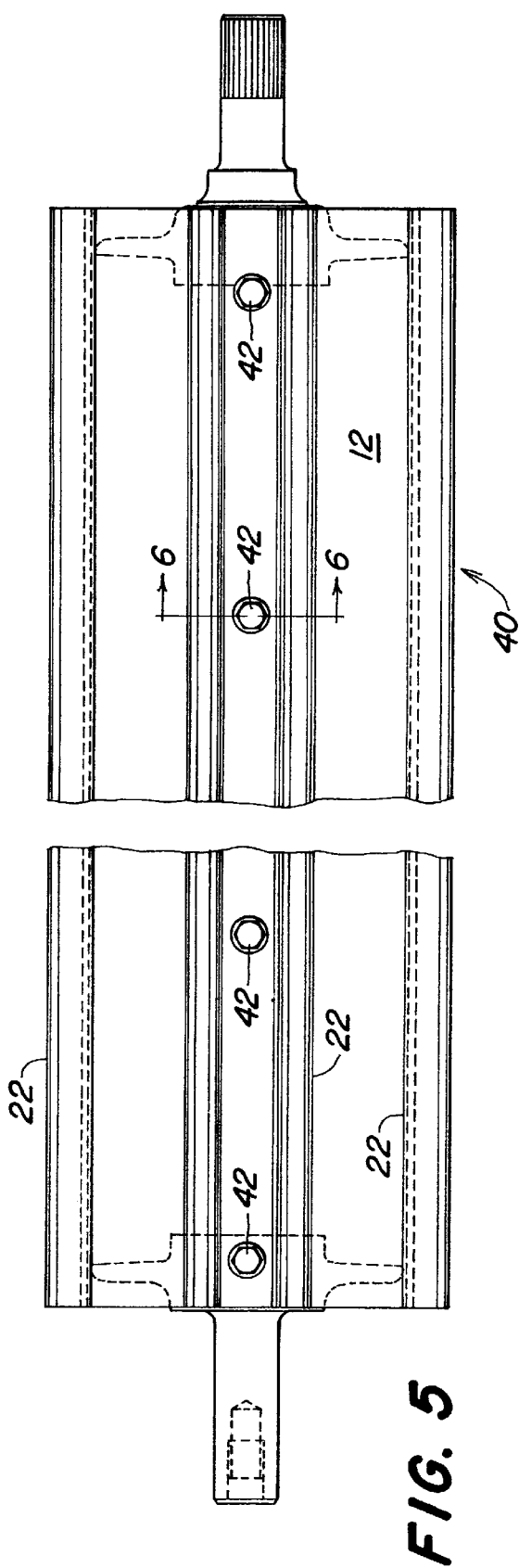
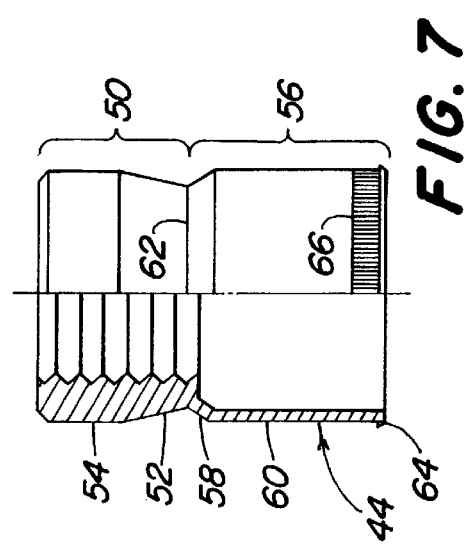

REMOVABLE FLUTES FOR CROP CONDITIONER CRIMP ROLLS

BACKGROUND OF THE INVENTION

The present invention relates to conditioner rolls for an agricultural crop conditioner and more particularly relates to conditioner rolls having removable crop conditioning flutes or elements.

There are many types of crop conditioner rolls. Some have polyurethane flutes. Others have steel flutes or steel Y-flail impellers. All rolls eventually wear out. Rubber and polyurethane wear faster than steel. Worn rolls degrade crop conditioning and they feed poorly causing uneven windrows.

Rubber and polyurethane rolls are expensive and require very expensive tooling to manufacture.

U.S. Pat. No. 2,811,819, issued to Heth on 5 Nov. 1957, discloses a conditioner roll including a tubular metal core onto which a plurality of cast metal flutes or bars are releasably fixed by bolts which extend through the flutes and are screwed into threaded holes provided in the wall of the core. Since molds are required to make these cast flutes, they too are relatively expensive. Furthermore, the thickness of the roll core does not provide adequate length for establishing a secure connection between the flutes and the core.

SUMMARY OF THE INVENTION

According to the present invention, there is provided an improved conditioner roll, and more particularly, there is provided an improved removable flute assembly for a conditioner roll having a tubular metal core.

It is an object of the invention to provide an easy, reliable and economical method of replacing worn or damaged conditioning elements while reusing the tubular metal core assembly.

A more specific object of the invention is to is to provide a conditioner roll comprising a tubular metal core and flutes in the form of elongated channel members each releasably attached to the core by a plurality of bolts respectively extending through aligned sets of holes provided in the core and flutes and being engaged in threads having a length greater than a nominal thickness of the metal core.

Yet another specific object of the invention is to provide a conditioner roll, as set forth in the immediately preceding object, wherein, in accordance with a first embodiment, each bolt extends outwardly through a respective set of the aligned holes in the core and flute and includes a serrated shoulder which is forced into the metal surrounding the core hole so as to prevent the bolt from turning when a nut is applied to a threaded end of the bolt.

Still another specific object of the invention is to provide a conditioner roll, as set forth above, wherein, in accordance with a second embodiment, a plurality of special nuts are swaged in place in the holes provided in the roll core so that the threaded part of each nut is inside the core and the bolts extend inwardly through the respective holes in the flutes and are threaded into aligned swaged nuts.

These and other objects will become more apparent from a reading of the ensuing description together with the appended drawings.

BRIEF DESCRIPTION OF THE DRAWINGS

FIG. 3 is a vertical sectional view taken along line 3—3 of FIG. 1.

FIG. 4 show one of the special mounting bolts used for attaching the channel member to the roll core.

FIG. 5 is a view like FIG. 1, but showing the flutes attached in accordance with a second embodiment of the present invention.

FIG. 6 is a vertical sectional view taken along the line 6—6 of FIG. 5.

FIG. 7 shows one of the swage nut inserts before being swaged in place.

DESCRIPTION OF THE PREFERRED EMBODIMENT

Figure 1:
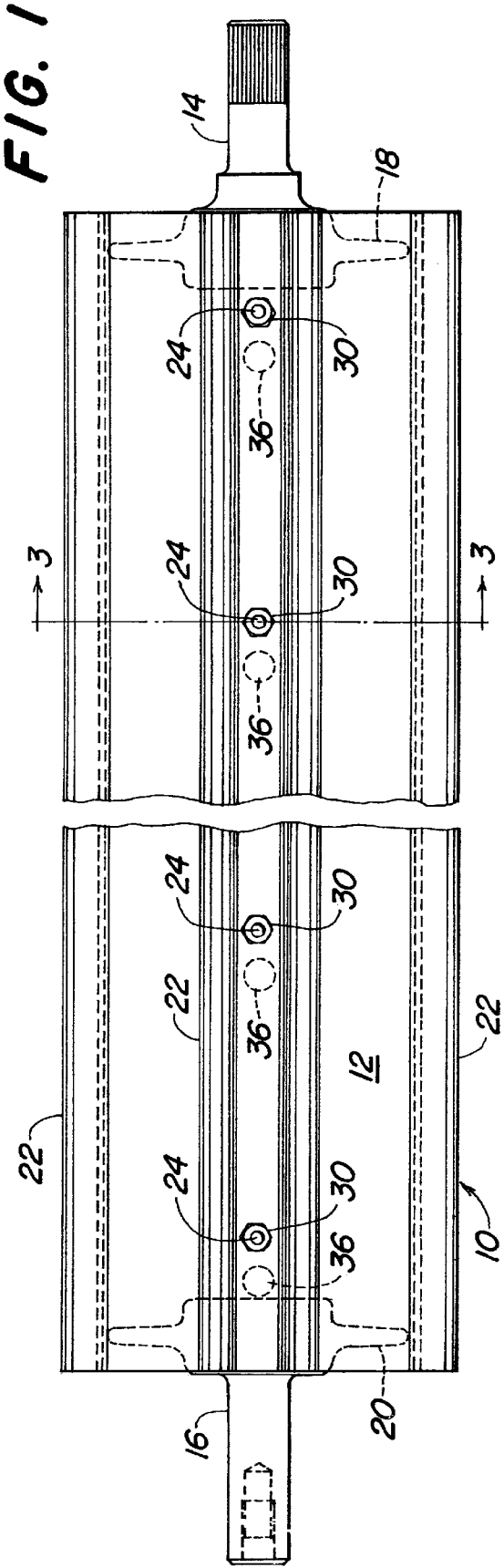
FIG. 1 shows a crop conditioner roll having flutes removably secured to its core in accordance with a first embodiment of the present invention.
Figure 2:
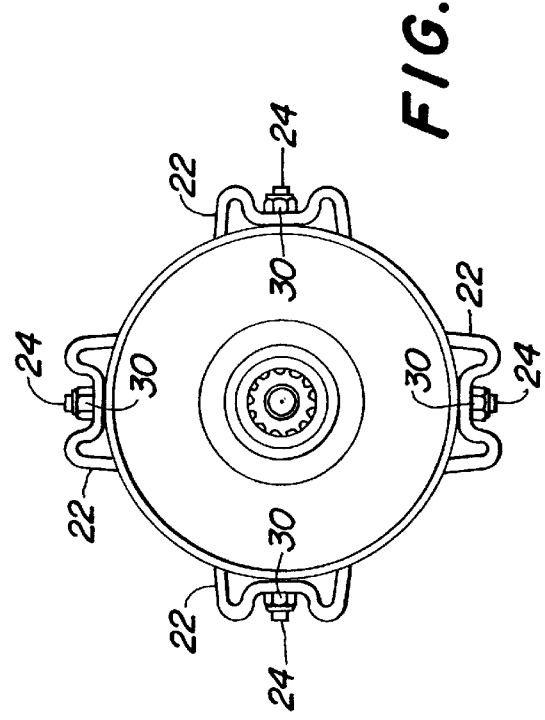
FIG. 2 is a right-hand end view of the conditioner roll shown in FIG. 1.

Referring now to FIGS. 1–4, there is shown a first embodiment of the invention comprising a crop conditioner roll 10 including a hollow cylindrical metal core 12 having stub shafts 14 and 16 joined to respective cylindrical flanges 18 and 20 respectively welded within right-and left-hand ends of the core 12. Four elongate, straight flutes 22 extend the full length of the core 12. The flutes 22 are respectively releasably fixed to the core 12 at four locations spaced 90° from each other about the core by a plurality of bolts 24, each extending outwardly through an aligned set of mounting holes 26 and 28 respectively provided in the core 12 and one of the flutes 22, the bolts each having a threaded end receiving a nut 30.

As shown in FIG. 4, the bolts 24 are a special type including a socket head 32, having a hexagonal socket, followed by a serrated or finned neck 34. The finned neck 34 of each bolt 24 is larger in diameter than the remaining threaded portion of the bolt. The mounting holes 26 have a diameter smaller than that of the finned neck 34, and the bolts 24 are installed by pressing them into the holes 26 from the inside of the core 12 so that the serrated necks 34 cut through the core material surrounding the holes 26. This results in the bolts 24 being anchored from turning during installation of the nut 30 associated with each bolt.

As can best be understood from viewing FIGS. 1 and 3, an access hole 36 is located adjacent each mounting hole 26 in the core 12, with the mounting holes 26 in the rows appearing at the three and six o'clock positions in FIG. 3 being located rightwardly of the access holes 36, and with the mounting holes 26 in the rows appearing at the nine and twelve o'clock positions in FIG. 3 being located leftwardly of the access holes 36. This results in the access holes 36 of the nine and twelve o'clock rows being in axial alignment with the mounting holes 26 of the three and six o'clock rows, as shown in FIG. 3) and in the access holes 36 of the three and six o'clock rows being in axial alignment with the mounting holes 26 of the nine and twelve 'clock rows. This permits each bolt 24 to be mounted in a respective one of the mounting holes 26 by placing the bolt in a pressing tool, inserting the tool through the access hole 36, inserting the threaded section of the bolt through the aligned mounting hole and then pressing the serrated neck 34 of the bolt into the material surrounding the hole 26 so as to hold the bolt in place. Once all of the mounting bolts 24 are in place, the flutes 22 are placed on the mounting bolts and the nuts 30 applied to hold the flutes in place.

Referring now to FIGS. 5 and 6, there is shown a second embodiment of the invention where the reference numerals in the description above are applied to like structure.

Specifically, there is shown a conditioner roll 40 including a core 12 having the flutes 22 attached thereto by a plurality of bolts 42 respectively inserted inwardly through the holes 28, provided in the flutes, and screwed into a swage nut 44, which when undeformed as shown in FIG. 7, is pressed radially inwardly through a mounting hole 46 located in the core in axial alignment with each flute hole 28. The bolt 42 acts to deform the nut 44, in a manner explained below, to form a stop shoulder 48 that prevents the nut from moving back through the core hole 46.

Referring now also to FIG. 7, it can be seen that the undeformed swage nut 44 comprises a tubular body defined by an internally threaded, relatively thick walled section 50 having an outer surface portion 52 which tapers inwardly from a cylindrical outer surface portion 54 so that the thickness of the section 50 diminishes in a direction away from the surface portion 54. A relatively thin walled section 56 of the nut includes a short end portion 58 which tapers inwardly, from a relatively long cylindrical portion 60, toward and is joined to the thinnest end of the section 50. The area of joinder of the tapered portion 58 to the thinnest end of the section 50 defines a bend line 62 about which the thin walled section 56 is axially deformable to form the stop shoulder 48 during tightening of the associated bolt 42 during mounting of one of the flutes 22 to the core 12. The upper end of the cylindrical portion 60 of the thin walled section 56 terminates at an annular stop ledge 64. Ribs or serrations 66 are provided about the thin walled section 56 adjacent the stop ledge 64 for anchoring the undeformed nut 44 in place in the associated core hole 46, the hole being sized to snugly receive the thin section portion 60. Thus, the nut 44 will be held from turning when the associated bolt 42 is being screwed thereinto during installation of the associated flute 22.

What is claimed is:

1. In a conditioner roll including a tubular metal core, at least one flute extending along said core and including a first series of holes, a second series of holes being provided in said core respectively in axial alignment with said first series of holes, with each pair of aligned holes defining a set of mounting holes, a bolt extending through each set of mounting holes, the improvement comprising: a nut being received on each bolt; and one of said bolt and nut being releasably anchored both axially and radially in each of said second series of holes, exclusive of another of said bolt and nut.

2. The conditioner roll defined in claim 1 wherein said bolt includes a ribbed neck; each of said second series of holes being sized smaller than a diameter of said neck and having the neck of a bolt inserted therein to establish an interference fit thereby anchoring the bolt in an associated one of said second series of holes.

3. The conditioner roll defined in claim 2 wherein a series of access holes are respectively provided in said core at diametrically opposite positions from said second series of holes, whereby the bolt associated with each of said second series of holes can be installed by using a tool to insert the bolt through an associated one of the access holes and then to press the bolt neck into an aligned one of the second series of holes.

4. The conditioner roll defined in claim 1 wherein said nut is a swage nut including a thin walled section joined to an internally threaded thick walled section and being inserted through an associated one of said second series of holes; said thin walled section having a stop ledge formed at one end located at an exterior surface of said core and having a shoulder engaging an interior surface of said core, said shoulder having been formed by axial deformation of said nut during installation of the associated bolt.

5. The conditioner roll as defined in claim 1 wherein said flute extends the full length of said core.

6. The conditioner roll defined in claim 1 wherein said flute comprises a metal channel member.

* * * * *